T. W. DIX.
THILL COUPLING.
APPLICATION FILED MAY 2, 1907.

906,516.

Patented Dec. 15, 1908.

3 SHEETS—SHEET 1.

Witnesses
W. J. Rockwell
L. L. Smith

Inventor
Thurman W. Dix.
By Chandler & Chandler
Attorneys

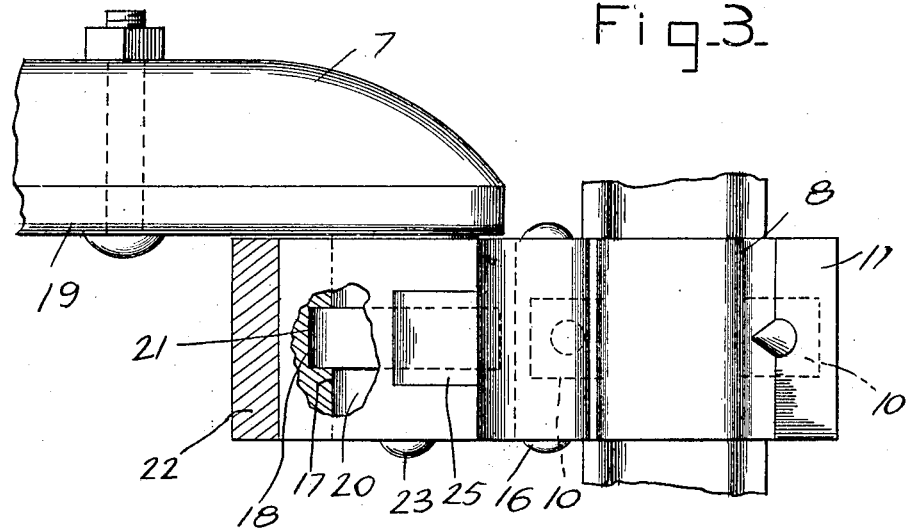
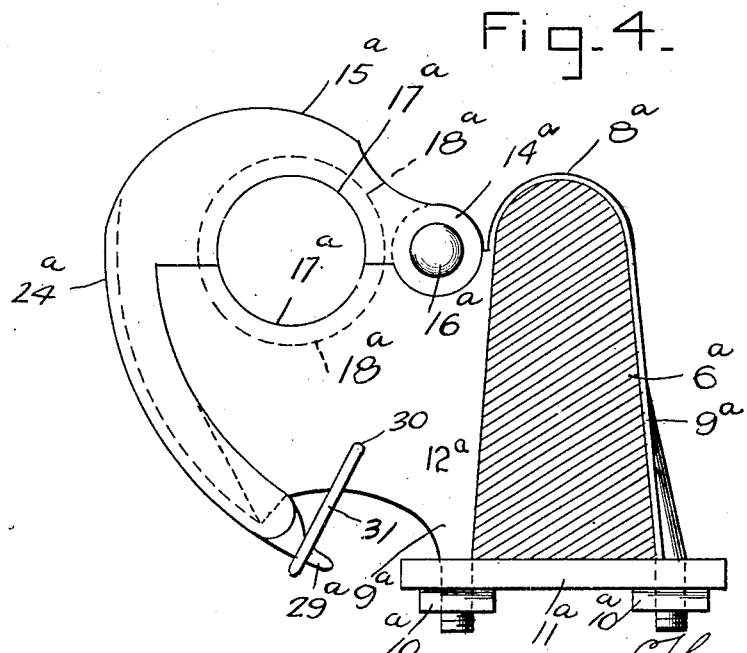

T. W. DIX.
THILL COUPLING.
APPLICATION FILED MAY 2, 1907.
906,516.
Patented Dec. 15, 1908.
3 SHEETS—SHEET 3.
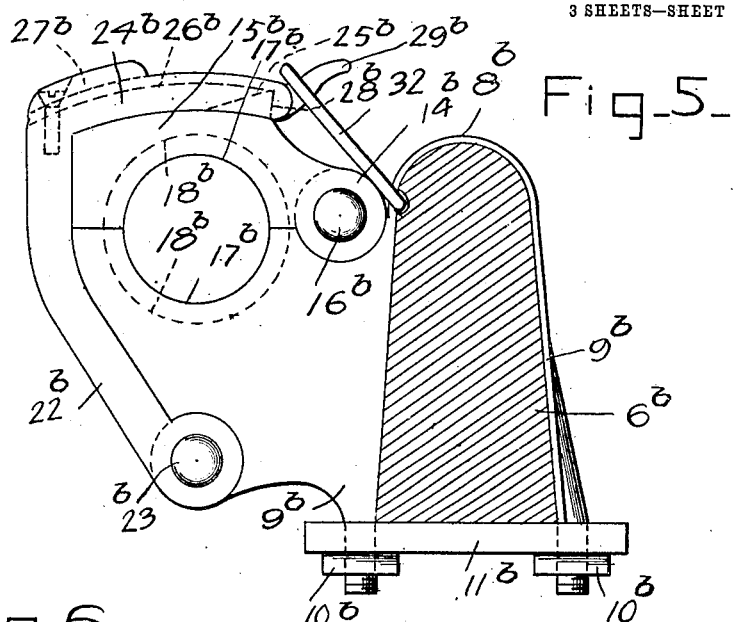
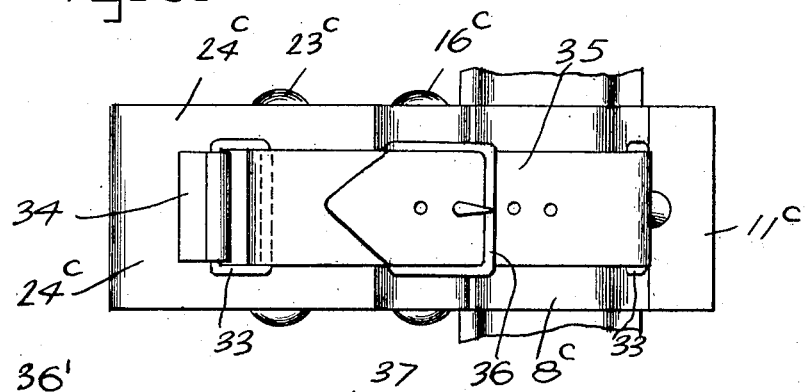
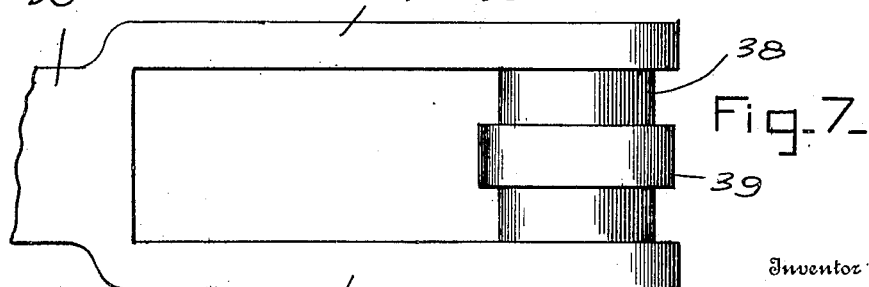
Witnesses
W. H. Rockwell
F. G. Smith
Inventor
Thurman W. Dix
By Chandler & Chandler
Attorneys

UNITED STATES PATENT OFFICE.

THURMAN W. DIX, OF BURLINGTON, VERMONT.

THILL-COUPLING.

No. 906,516.  Specification of Letters Patent.  Patented Dec. 15, 1908.

Application filed May 2, 1907. Serial No. 371,476.

*To all whom it may concern:*

Be it known that I, THURMAN W. DIX, a citizen of the United States, residing at Burlington, in the county of Chittenden, State of Vermont, have invented certain new and useful Improvements in Thill-Couplings; and I do hereby declare the following to be a full, clear, and exact description of the invention, such as will enable others skilled in the art to which it appertains to make and use the same.

This invention has relation to thill couplings and has for its primary object to provide a simple construction of this nature which, although it will securely hold the thills of a vehicle, may be readily operated to release the same.

The invention further has for its object to provide a device of this nature which will automatically lock to hold the thills the use of set screws and the like being in this manner avoided.

Figure 1:
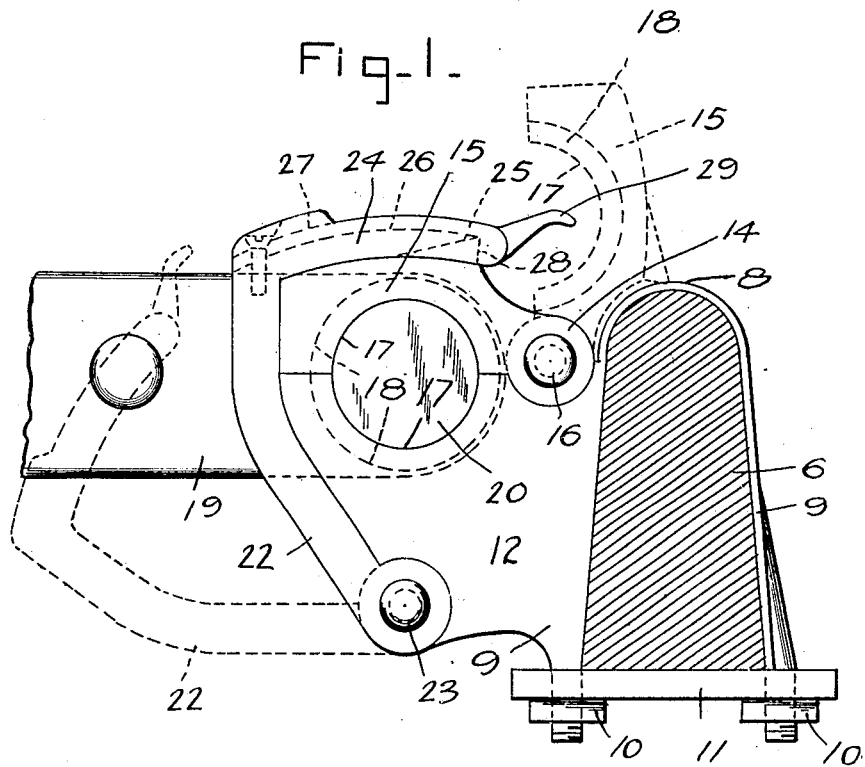
Figure 2:
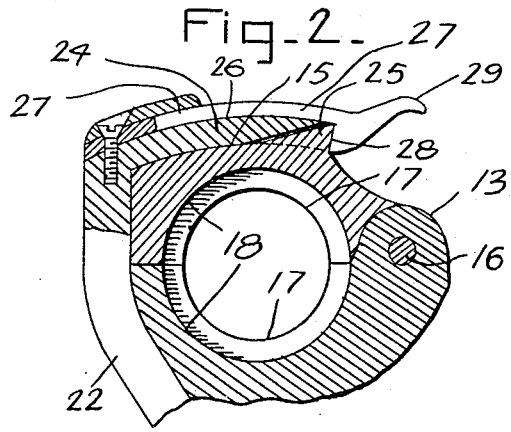

In the accompanying drawings, Figure 1 is a side elevation of the device in use and showing in dotted lines the position of parts when the coupling is open, Fig. 2 is a detail vertical longitudinal sectional view through a portion of the coupling, Fig. 3 is a top plan view thereof, parts of the device being broken away, Fig. 4 is a similar view to Fig. 1 showing a slightly modified form of the invention, Fig. 5 is a similar view showing another modification of the same, Fig. 6 is a plan view showing a still further modification and, Fig. 7 is a detail plan view of a modified form of thill iron.

Referring more specifically to the drawings the numeral 6 denotes the front axle of a vehicle and 7 the thills which are coupled by means of my thill couplings. Each or the said couplings comprises a yoke clip 8 which includes the usual spaced arms 9 which are threaded at their lower end for the engagement therewith of nuts 10, the clip being engaged upon the axle 6 and held therein by the said nuts 10 and a plate 11 which is interposed between the under side of the axle and the said nuts.

Upon one of the spaced arms 9 of the clip is formed a forwardly extending lug which is provided at its straight upper edge and adjacent the point of junction with the said arm, with an apertured ear 13 which is located between spaced apertured ears 14 formed on a cap member 15, the said cap member being hinged to this forwardly extending lug by means of a pintle pin 16 which is engaged through the apertures in the ears 13 and 14. The meeting edges of the lug and cap member are recessed semi-circularly as at 17 and the wall of each recess is grooved as at 18 for a purpose to be hereinafter stated, it being obvious that when the cap is resting upon the lug, a circular opening is formed by the recesses.

To the thill 7 is bolted or otherwise secured a thill iron 19 and projecting laterally from this thill iron is a stud 20 which is flanged as at 21 intermediate its outer end and the plate 19 upon which it is formed. When the thills are coupled with the vehicle, the stud 20 is engaged in the opening formed by the recesses in the lug 12 and its cap member 15 with the flange 21 seated in the groove 18, the said flange serving to prevent lateral movement of the thill iron and its disengagement from the coupling.

In order to hold the cap member against movement, a plate 22 is hinged by means of a pin 23, passing through an opening near the lower forward edge of the lug, and this hinge plate is provided at its upper and free end with a lateral extension 24 which is arranged to overlie the cap member 15 when the same is resting upon the lug. The said cap member is provided upon its upper edge with a shoulder 25 and secured at one of its ends to the extension 24 and resting in a recess 26 in the upper face of the said extension is a spring catch 27 which is also provided at its end with an engaging lip 28 for engagement with the shoulder 25, there being also a finger piece 29 formed upon the said end of the spring catch whereby the same may be lifted from engagement with the shoulder 25 to release the thill.

In the form of my invention shown in Fig. 4, the parts corresponding to those in the preferred form are indicated by the same reference numerals with the addition of the letter "a". An opening 30 is formed through the lug 12ª and through the opening 30 is engaged one end of a yoke member 31 which is substantially rectangular in form and which is adapted for engagement at its opposite end over the finger piece 29ª to prevent movement of the cap member 15ª and in this form of the invention the arm 24ª is formed integral with the cap member 15ª and the arm 22 is omitted.

In the form of my invention shown in Fig. 5, the parts corresponding with those in the preferred form are indicated by the same reference numerals with the addition of the letter "b" and in this form of the invention a yoke member 32 which is identical in construction with the yoke member 31 shown in Fig. 4, is engaged between the upper end portion of the clip 8 and the corresponding portion of the vehicle axle. In this form of the invention the parts, with the exception of the yoke member 32 are identical in construction and arrangement with those shown in the preferred form.

I have found it expedient under some circumstances to use straps instead of yoke members above referred to and for this purpose I provide a pair of bails 33 which are hingedly connected one with the arm 24ᶜ and the other with the clip 8ᶜ by means of suitable attaching plates 34 which may be welded, riveted or otherwise secured to the said arm and clip. A strap 35 is engaged through the said bails and includes a buckle 36 by means of which it may be tightened to hold the arm in position to prevent accidental swinging of the cap member. I have also found it expedient to use a thill iron of the construction shown in Fig. 7 under certain circumstances, the said thill iron comprising a body portion 36′ which has one of its ends forked to form spaced portions 37 which are connected at their ends by means of the integral stud 38 having an annular flange 39, the spaced members 37 being arranged to lie upon the opposite sides of the coupling and the flange 39 in the groove formed in the body portion of the coupling and its cap member.

What is claimed, is—

In a thill coupling the combination with a clip having a forwardly extending lug, of a cap pivotally secured to said clip, having an upwardly extending shoulder, a plate hinged at its lower end to the forward lower edge of said lug, the upper end of said plate being bent at an angle to overlie said cap, a spring catch secured to said plate to latch over said shoulder, and a thill iron removably held between said lug and cap.

In testimony whereof, I affix my signature, in presence of two witnesses.

THURMAN W. DIX.

Witnesses:
CHARLES E. ALLEN,
HERBERT B. SMALL.